May 26, 1964     W. PENNINGTON, JR     3,134,225
THRUST CONTROL SYSTEM

Filed March 2, 1960     4 Sheets-Sheet 1

WILLIAM PENNINGTON, JR.
INVENTOR.

BY
ATTORNEY

May 26, 1964     W. PENNINGTON, JR     3,134,225
THRUST CONTROL SYSTEM

Filed March 2, 1960     4 Sheets-Sheet 2

WILLIAM PENNINGTON, JR.
INVENTOR.

BY
ATTORNEY

May 26, 1964  W. PENNINGTON, JR  3,134,225
THRUST CONTROL SYSTEM
Filed March 2, 1960  4 Sheets-Sheet 3
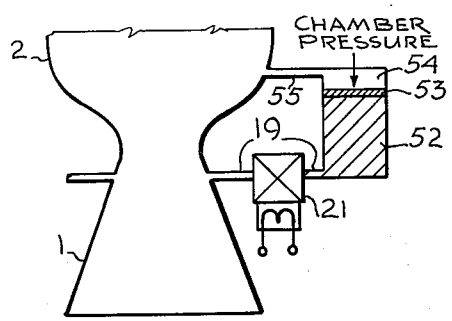
Fig. 5
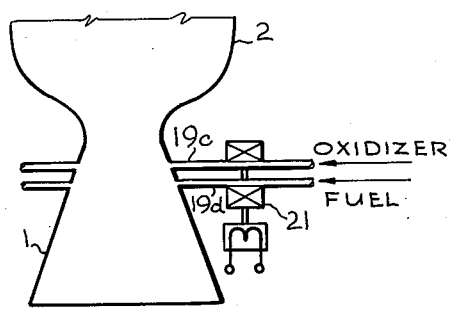
Fig. 6
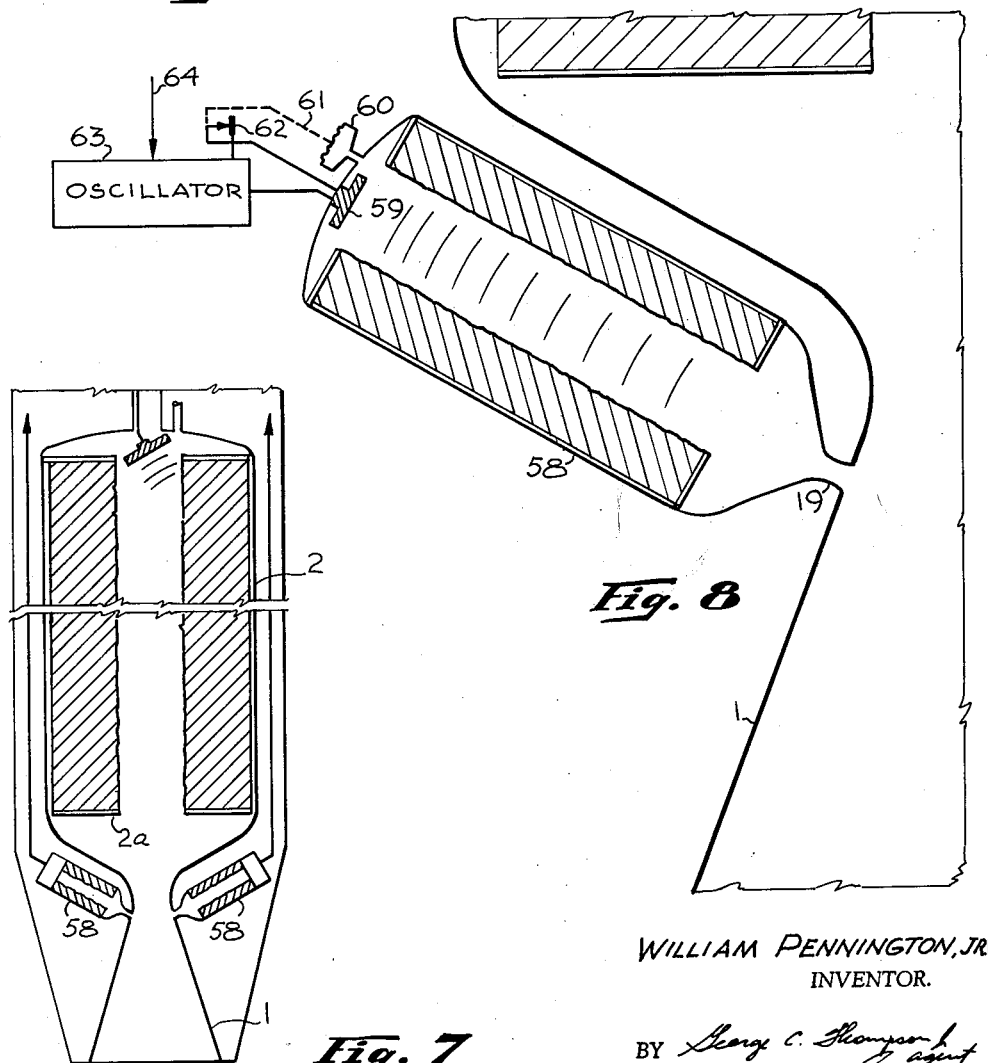
Fig. 7
Fig. 8
WILLIAM PENNINGTON, JR
INVENTOR.
BY George C. Thompson, agent
Morris Spector,
ATTORNEY

United States Patent Office

3,134,225
Patented May 26, 1964

3,134,225
THRUST CONTROL SYSTEM
William Pennington, Jr., Los Angeles, Calif., assignor to Thompson Ramo Wooldridge Inc., Canoga Park, Calif., a corporation of Ohio
Filed Mar. 2, 1960, Ser. No. 12,470
2 Claims. (Cl. 60—35.54)

This invention relates to a thrust control system for jet thrust reaction motors and in particular to the control of the magnitude and direction of exhausts from reaction engines.

In rocket or jet engines, some method of guidance and thrust control must be provided. Some of the many methods already explored involve the use of vanes for deflecting the exhaust from a rocket or jet engine to provide yaw, pitch and roll control and the use of gimbaled thrust motors capable of providing pitch and yaw control, but unable to provide roll control. In the case of deflection vanes, for the purpose of providing guidance, some thrust is lost due to the disturbance caused by the vanes in the exhaust path. The use of gimbals for positioning the motor or nozzle with respect to the vehicle increases the load to be lifted by the reaction motor.

It is, therefore, an object of this invention to provide reaction motor guidance providing an actual increase in thrust rather than a decrease in thrust.

It is another object of this invention to provide directional control of a reaction motor vehicle without relatively moving guidance members.

It is another object of this invention to provide directional control through the introduction of disturbances in the reaction engine exhaust nozzle.

It is another object of this invention to provide guidance and thrust control of solid propellant reaction motors through the introduction of sound waves.

Other objects, purposes and characteristic features will become obvious as the description of the invention progresses.

The principles of the invention as set forth in one embodiment described herein involves the use of a solid propellant rocket and auxiliary rocket devices for guidance purposes. Each rocket chamber is provided with a wave propagation generator for controlling the rate of burning within the chamber. The guide rockets provide directional control with relatively small solid propellant devices positioned to introduce control exhaust gases disturbing influences within the exhaust nozzle of the main rocket. Each of the smaller guidance devices provides guidance through thrust differences in the disturbances introduced in the main rocket nozzle.

FIGURES 4 through 8 are views illustrating different methods of disturbance introduction in typical rocket engine nozzles.

In each of the several views similar parts bear like reference characters.

Figure 1:
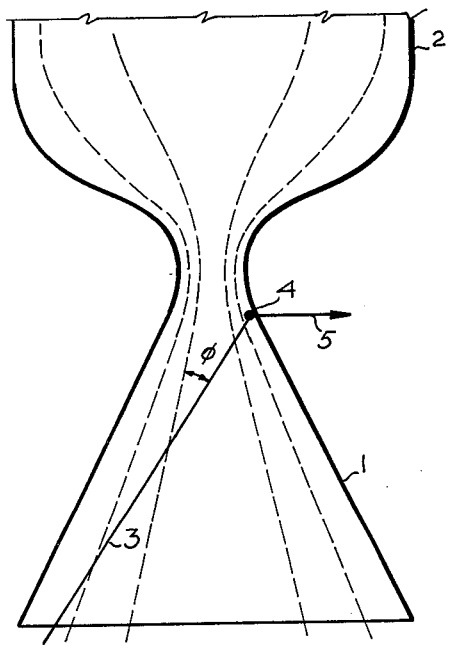
FIGURE 1 is a schematic view of a rocket nozzle showing the effect of a direct control disturbance.

The typical rocket nozzle 1 of a rocket 2, shown in FIGURE 1, illustrates the effect of the introduction of a disturbance 3 at a point 4 in the rocket nozzle 1. The point 4 should be located downstream from the most restricted point of the rocket nozzle for proper control characteristics. The shock wave introduced at the point 4, by a method to be described hereinafter, is restricted to the speed of sound or less in a high velocity supersonic rocket exhaust. The disturbance will therefore pass downstream of the rocket nozzle, such as illustrated by the line 3, at an angle $\phi$ with respect to the exhaust from the main rocket engine of the rocket 2. It should be pointed out that the shock wave 3 must not contact the opposite surface of the nozzle 1 from the point of introduction and will not reach it in a 15° half angle expansion cone if the expansion ratio is under 10. The shock wave, such as the shock wave 3, would provide a vector force adding to the thrust of the main rocket engine and a vector force introducing a side thrust at the point 4 in the direction of the arrow 5. This side thrust would, therefore, provide motion of the rocket about its center gravity in the direction of the arrow 5.

Figure 2:
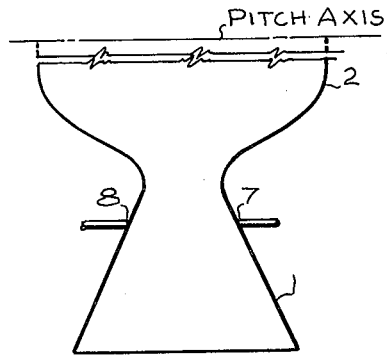
FIGURES 2 and 2a are sectional views illustrating three-direction control of a typical rocket engine nozzle.
Figure 2A:
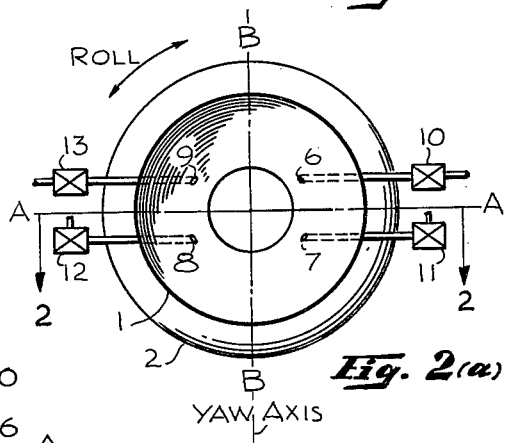

FIGURES 2 and 2a illustrate the placement of thrust producing injection points 6, 7, 8 and 9 capable of being selected in combination providing yaw, pitch and roll control of the associated rocket 2. The introduction of propellant mixtures by the pipes 6 through 9 is controlled by a selecting system capable of selectively controlling the introduction of propellant mixtures through the pipes 6 through 9 by control devices 10 through 13. The control devices 10 through 13 are symbolically shown as valves, however, they may be in the form of sound generators or similar devices depending upon the type of control needed. If we assume that the valve device 10 controls the introduction of the propellant to the pipe 6, the valve device 11 controls propellant introduction to the pipe 7, the valve device 12 controls propellant introduction to the pipe 8 and valve device 13 controls propellant introduction to the pipe 9, it can be seen that a selection of the proper control devices can cause the introduction of disturbances from any one or a plurality of the pipes 6 through 9 for a desired rocket control. For example, if the devices 10 and 13 or 11 and 12 are allowed to introduce propellant through the pipes 6 and 9 or 7 and 8, respectively, it can be seen that disturbances can be set up on selected sides of an axis "A" to provide pitch control in one direction or another depending upon which pair is activated. The magnitude of control action depends upon the disturbance created and the displacement of the pipes from the control axis. If, however, the control devices 10 and 11 or 12 and 13 are selected, propellant is introduced through the pipes 6 and 7 or 8 and 9, respectively, setting up disturbances on one side or the other of an axis "B" depending upon which pair is selected for providing yaw control. The remaining motion to be taken care of is one involving the control of roll of the missile about its center axis. Roll control can be accomplished through the selection of valve combinations of 10 and 12 or 11 and 13 depending upon the direction of roll desired. If valves 10 and 12 are selected, propellant is introduced through the nozzles or pipes 6 and 8, respectively, which are physically displaced with respect to the center of the nozzle with the pipes being on opposite sides of the center point, the two pipes, therefore, provide disturbances physically displaced in the horizontal plane causing an off center force effect providing roll rotation motion. For roll motion in the opposite direction, the valves 11 and 13 introduce propellant through the pipes or nozzles 7 and 9, respectively.

Figure 3:
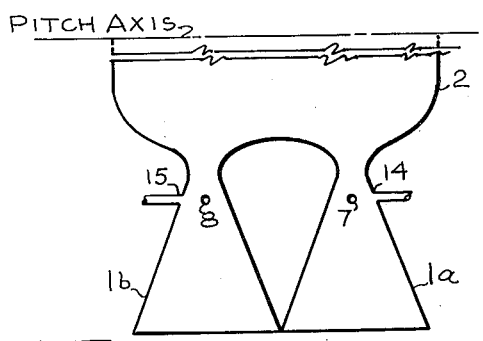
FIGURES 3 and 3a are sectional views illustrating three-direction control of a different rocket nozzle arrangement.
Figure 3A:
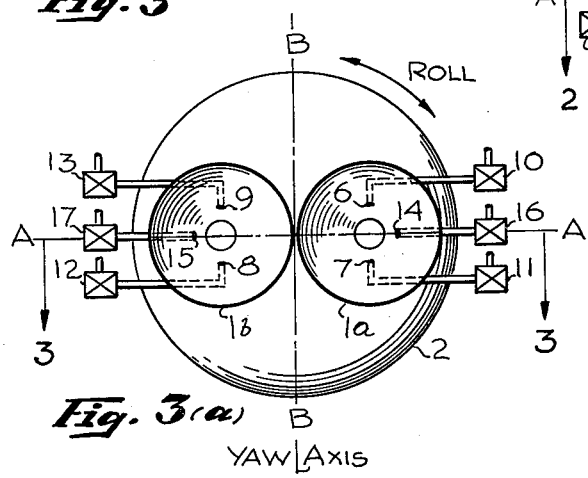

In the embodiment illustrated in FIGURES 3 and 3a a rocket nozzle area is now separated into two nozzles 1a and 1b with the directional control pipes 6 through 9 now positioned with two in each nozzle. In addition, each nozzle is also provided with an additional directional control pipe, with the nozzle 1a having the control pipe 14 and the nozzle 1b having the control pipe 15 capable of providing additional yaw control about the axis "B" and unaffecting the pitch control since these pipes and nozzles are located along the pitch axis. Operation of the roll, pitch and yaw controls is the same as that described in connection with FIGURES 2 and 2a with the exception that stronger yaw control can be accomplished through the selective introduction of the two pipes 14 and 15. Pipes 14 and 15 are controlled by the valves 16 and 17, respectively.

The control functions hereinbefore described in connection with FIGURES 1 through 3a can be accomplished through the use of liquid or solid propellant introduction at the pipes 6 through 9, 14 and 15 and in FIGURES 4 through 6 there are shown several methods of introducing liquid propellant to exhaust nozzles 1.

Figure 4:
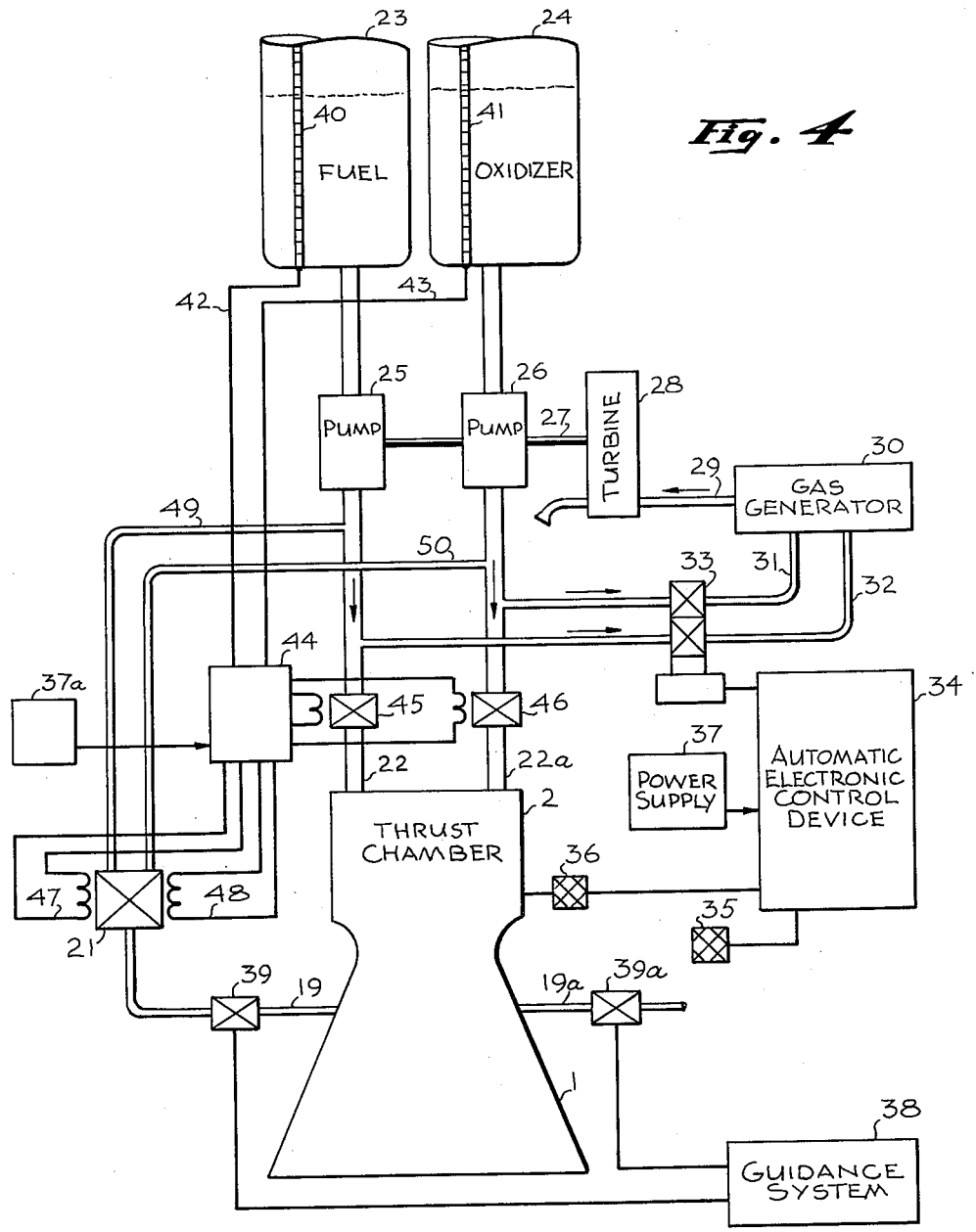

The arrangement of FIGURE 4 involves the supply of propellant to a thrust chamber and rocket nozzle 1 which is controlled by two factors. The first is the propellant in proportions of fuel and oxidizer capable of providing a stoichiometric balance. However, the second factor is that the system must also provide for emptying fuel and oxidizer tanks at the same time, which may involve the increase in flow of either fuel or oxidizer causing a stoichiometric unbalance. In the system of FIGURE 4, a typical control system of well-known type is set forth as capable of supplying fuel and oxidizer through the pipes 22 and 22a, respectively, from the reservoirs or tanks 23 and 24, respectively. In order to provide the fuel and oxidizer with adequate pressure, a pair of pumps 25 and 26 are inserted into the pipes 22 and 22a, respectively, and both pumps 25 and 26 are driven off of a common shaft 27 by a hot gas turbine 28. The hot gas turbine is supplied with hot gases from the gas generator 30 through the gas line 29. The gas generator 30 is supplied with operating fuel and oxidizer from the pipes 22 and 22a, respectively, through the pipes 32 and 31, respectively. The flow of fuel and oxidizer to the gas generator 30 is controlled by a dual throttle valve member 33 controlled from an automatic control device 34 of any well-known type capable of programming the desired thrust output of the rocket engine. The control device 34 is provided with a reference transducer 35 which is used as a standard of comparison for the chamber pressure transducer 36 to determine the thrust output of the rocket engine 2. The control device 34 is also supplied with any suitable power supply 37 capable of providing its power needs.

The system thus far described is capable of comparing the actual thrust of the rocket engine 2 against a desired thrust reference from the transducer 35 to program the fuel flow from the gas generator 30, which, in turn, supplies power to the pumps 25 and 26 to adjust the thrust level of the rocket engine 2 in response to the automatic control 34 program. In addition to thrust control programmed by the automatic device 34, it is also necessary to provide guidance control from a suitable well-known type of guidance system 38 capable of controlling the flow of fuel or oxidizer into the nozzle 1 through one or more of the pipes 19 and 19a as selected by one or more of the control valves 39 and 39a.

Since it is known that under almost all conditions some stoichiometric unbalance occurs in the exhaust gases of the rocket nozzle 1, it is desirable to provide a selection means for supplying to the nozzle directional control fuel or oxidizer depending upon which way the unbalance exists. This fuel or oxidizer selection control is provided by sensing the fuel and oxidizer levels in the fuel and oxidizer tanks 23 and 24 through the use of a pair of transducers 40 and 41, respectively.

Transducers 40 and 41 provide outputs over the output circuits 42 and 43, respectively, to a level difference sensor 44 having a source of power 37a. Th level difference sensor then supplies control signals to a pair of valves 45 and 46 located in the pipes 22 and 22a, respectively, for controlling the proportions of fuel and oxidizer supplied to the rocket engine 2 in accordance with the level of fuel and oxidizer in the tanks 23 and 24, respectively. The primary purpose of this device is to provide for complete usage of both fuel and oxidizer leaving both tanks 23 and 24 empty at the end of the thrust period. In addition to providing control for the valves 45 and 46, the level difference sensor 44 selectively provides output signals on one of the circuits 47 or 48 depending upon whether the balance of fuel supply is in favor of fuel or oxidizer respectively. If the tank sensing, for example, is toward an excessive fuel level in the tank, the sensor will favor supplying additional fuel and less oxidizer. The valve 21 would then be arranged to provide connection between the pipe 19 and the pipe 49 which is connected to the fuel supply pipe 22. In this case fuel would be supplied by the pipe 49, the valve 21, the valve 39 and pipe 19 to the nozzle 1. Since the thrust chamber exhaust is rich in oxidizer, the fuel will mix therewith to provide a directional thrust control in the nozzle 1 as explained hereinbefore. Similarly, if the rocket engine exhaust is rich in fuel the level difference sensor will provide a control signal to the valve 21 over the circuit 48 to provide oxidizer supply to the nozzle 1 from the oxidizer supply line 22a over the pipe 50, the valve 21 and valve 39 to the pipe 19.

The arrangement shown in FIGURE 5 illustrates the use of a separate reservoir of propellant 52 provided with a piston 53 having adjacent chamber 54 connected to a pipe 55 which is in turn connected to the rocket motor chamber of the rocket motor 2. The reservoir 52 is connected to a pipe 19 (typical of any one of the pipes 6 through 9, 14 and 15) and a control valve 21 to the rocket nozzle 1 to introduce propellant into the rocket nozzle as described hereinbefore. The propellant within the reservoir 52 must be of a monopropellant type or oxidizer since it is introduced through a single pipe 19.

The arrangement of FIGURE 6 assumes that the exhaust of the rocket motor 2 is stoichiometrically balanced thus requiring oxidizer and fuel. This arrangement involves the use of separate pipes 19c and 19d capable of introducing into the nozzle 1 the proper amounts of fuel and oxidizer in response to the control valve 21 actuation. Mixture of the oxidizer and fuel by the dual pipes 19c and 19d sets up the desired disturbance in the nozzle or cone 1 for control purposes.

In the views of FIGURES 7 and 8, there is illustrated a complete solid propellant rocket system involving a solid propellant main rocket 2 containing a solid propellant 2a, a single rocket cone 1, and a plurality of solid propellant rocket control devices 58 opening through typical pipes 19 into the main single rocket exhaust cone 1. Each of the solid propellant rockets, whether it be the main rocket 2 or the control rockets 58, is provided with a control system regulating the burning rate of each of the solid propellants. The control utilizes sonic or ultrasonic waves introduced into the propellant chamber by a wave transducer such as a vibrator or an ultrasonic wave developing device such as a piezoelectric device 59 positioned to propagate the waves at an angle to the propellant chamber. The sonic or ultrasonic waves established within the chamber will strike the propellant 2a and rebound several times to cause a change in the agitation of the relatively cooler propellant with the hot gases and chemical combination of the surface of the solid propellant burning therein with the change being either toward an increase or decrease depending upon the frequency and/or amplitude of the sonic or ultrasonic waves. The frequencies can be expected to be effective from the sonic range up through high ultrasonic limits. In order to determine the pressure within the chamber of the rocket motor 2, a pressure transducer 60 is provided for moving a contact device 62 through the mechanical link 61 to provide control of a driving oscillator 63 connected to the sonic or ultrasonic transducer 59. The contact device 62 illustrated herein may control either the frequency or the amplitude of the oscillator and in response to the transducer 60 may be used to control the burning rate to maintain a desired pressure selected by an input circuit 64 from a program control system (not shown).

Although the sonic or ultrasonic control is shown associated with one of the control rockets 58, it should be understood that each of the control rockets as well as the main rocket motor 2 would also be provided with such a control system.

Figure 9:
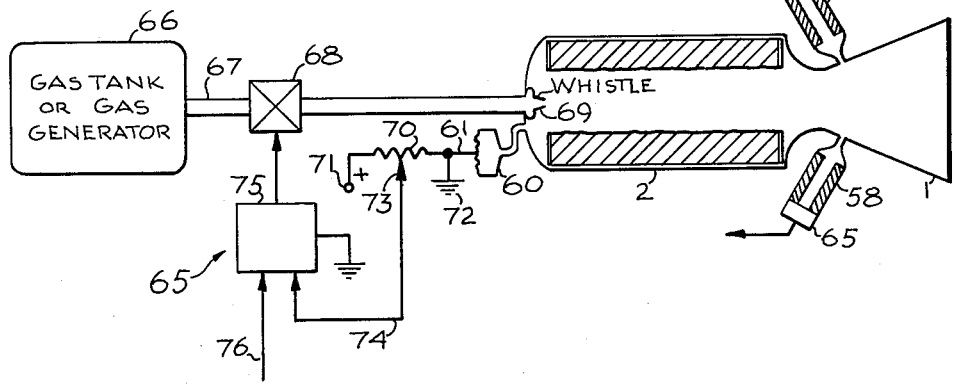
FIGURE 9 is a schematic illustration of another method of introducing sound waves in a solid propellant rocket and providing control therefor.

The embodiment shown in FIGURE 9 illustrates the use of a solid propellant rocket motor 2 provided with a control system 65 for producing sound waves in the chamber of the rocket motor 2. The main rocket 2 is provided with the usual nozzle 1 having guidance rockets 58 of solid propellant type each of which is also provided with a control arrangement 65 for controlling the rate of burning. The wave control for rocket motor 2 (or each of the direction rocket motors 58) comprises a gas supply 66 connected through a pipe 67 and control valve 68 to a gas sound wave generator or whistle 69 positioned in the end of the rocket motor 2 for producing sound waves therein. The rocket motor 2 is provided with a pressure sensing device 60 connected through mechanical link 61 to a potentiometer 70 connected across a suitable source of power (not shown) by the terminals 71 and 72. The potentiometer 70 is provided with a relatively movable contact 73 connected to a conductor 74 which is, in turn, connected to a valve control 75 capable of positioning the valve 68 in response to the position of the contact 73 on the movable potentiometer 70. The valve control device 75 is also responsive to an input circuit 76 to cause the valve 68 to open and produce sonic vibrations in the rocket motor 2 through operation of the sound device 69.

Operation of the control system will now be described in which the solid propellant rocket motor 2 is energized causing a pressure to build up in the chamber. At the initiation of burning in the rocket motor 2, a control signal is delivered to the valve control device 75 over the control circuit 76 to open the valve 68 causing the sound generator 69 to establish sonic vibrations within the rocket motor 2. As the pressure increases within the rocket motor 2 the potentiometer 70 is moved causing the arm 73 to be displaced therealong to provide a control voltage on the circuit 74 capable of additional control of the valve control 75. Since this is an amplitude control circuit the potentiometer voltage is arranged to oppose the incoming controlling circuit 76 voltage to start restricting the flow of gas from the tank 66 to the sound generator 69 by partially closing the valve 68. As the amplitude of the sound waves decrease and the burning rate changes within the rocket motor 2, the established level selected by the input control voltage on the circuit 76 is maintained.

It can be seen that if the sound generation is decreased below the level necessary to maintain the rate of burning selected, the potentiometer 70 is moved in the opposite direction to cause the arm 73 to change its output voltage to provide less opposition to the voltage of the input control circuit 76, thus again causing the valve 68 to open and increase the amplitude of the sound waves in the rocket motor 2.

If this same circuit 65 is used for controlling the guidance rockets 58, it is simply a matter of providing the input circuits 76 with the proper voltage level from a suitable guidance system (not shown) to establish balance or unbalance conditions between the guidance rockets 58.

Figure 10:
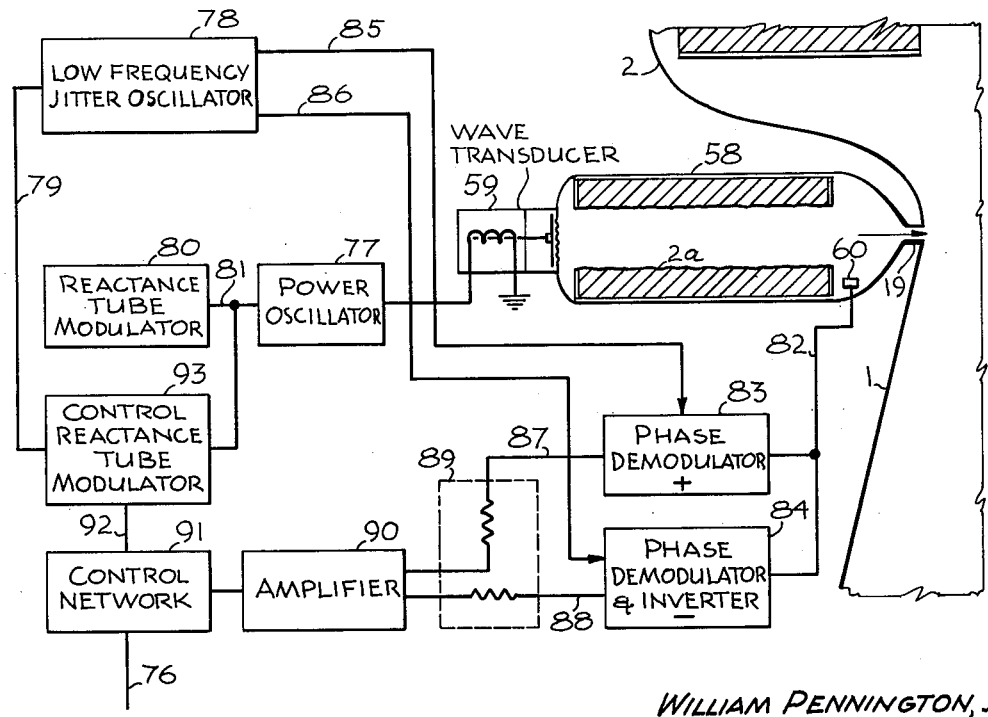
FIGURE 10 is a schematic view of a typical control system for controlling the burning rate of a solid propellant engine.

In FIGURE 10 there is disclosed an electronic circuit for providing sonic or ultrasonic frequencies in the combustion chamber of the solid propellant rocket whether it be the main rocket 2 or one of the guidance rockets 58. This figure illustrates the control as being associated with a guidance rocket 58 provided with a wave transducer 59 and a suitable pressure detector 60. The guidance rocket 58 is connected through a pipe 19 into the main rocket nozzle cone 1 as described hereinbefore.

Since the frequency or amplitude necessary for control purposes will vary with the control desired and with the propellant used as well as the size of the chamber within the rocket motor 58, it is necessary to provide a variable frequency power oscillator 77 connected to drive the wave producing transducer 59 at whatever frequency is selected for the oscillator 77. It is pointed out that the oscillator 77 may in fact be a plurality of oscillators providing mixtures of sine waves at different frequencies for wave transducer 59 control.

In order to select the frequency or frequencies to be generated by the oscillator 77 a relative low frequency jitter oscillator 78 is provided which is continually changing its frequency between established limits. The jitter oscillator 78 provides an output signal over an output circuit 79 connected to control a reactance tube modulator 80 which is, in turn, connected through the circuit 81 to drive the power oscillator 77. In response to this jitter oscillator frequency, the power oscillator sets up vibration by the wave transducer 59 in the rocket motor 58. As the burning increases, the pressure transducer 60 detects the pressure and provides a feedback alternating frequency output voltage over the circuit 82 which is directed to a phase demodulator 83 and a phase demodulator and inverter 84 connected in parallel. In order to compare the phase of the frequency of voltage on the circuit 82 (established by the pressure detector 60) with the actual present frequency of the jitter oscillator 78 to determine the direction of frequency change for maximum pressure level, one-half cycle of the frequency wave generated by the jitter oscillator is delivered over the circuit 85 to the phase demodulator 83 for comparison with the voltage on the circuit 82. During the other half cycle of the jitter oscillator frequency, the voltage is supplied over the circuit 86 from a jitter oscillator to the phase demodulator and inverter 84. A comparison of the phase of pressure detector voltage in the circuit 82 is then made with the half wave voltages in the circuits 85 and 86 with these voltages providing an output on circuits 87 and 88 of the phase demodulators 83 and 84, respectively. The output voltages on the circuits 87 and 88 are then algebraically summed by the summing circuit 89 to provide a differential input to a suitable control signal amplifier 90 responsive to the direction of frequency change causing a burning increase. The signal on the amplifier 90 is then compared with a control signal on the control input circuit 76 and combined in a control network 91. The combined signals then provide an output on the control circuit 92 to a control reactance modulator 93 capable of modifying the input to the power oscillator 77 from the reactance modulator 80.

If the incoming control signal from a control circuit 76 is ignored, it can be seen that the pressure detector 60 will provide a signal capable of driving the power oscillator 77 in cooperation with the jitter oscillator 78 to control the wave transducer 59 to provide maximum burning of the solid propellant 2a in the rocket engine 58. If maximum burning is not desired, a control signal on the control circuit 76 causes a shift in the feedback frequency from the maximum burning frequency to control the burning to a desired level.

While there has been described what is at present considered the preferred embodiment of the invention, it will be obvious to those skilled in the art that various changes and modifications may be made therein without departing from the true spirit or scope of the invention.

What is claimed is:

1. In a jet reaction engine having high velocity exhaust gases escaping through nozzle means, fuel tank means containing fuel and oxidizer tank means containing oxidizer, a control system comprising:

a plurality of spaced apart injection means in said nozzle means for introducing fuel and oxidizer in a direction at least partially transverse to said exhaust gases;

first control means for providing jet reaction engine thrust control;

guidance system control means for selectively introducing said fuel and oxidizer through said injection means for providing yaw, pitch and roll control by the generation of reaction disturbances proceeding in directions at least partially transverse to said high velocity exhaust gases; and sensing means for determining the difference in respective levels of fuel and oxidizer contained in said tank means and for selecting the introduction of fuel and oxidizer through said injection means in response to said difference in levels.

2. In a jet reaction engine having high velocity exhaust gases escaping through nozzle means, fuel tank means containing fuel and oxidizer tank means containing oxidizer, a control system comprising:

a plurality of spaced apart injection means including injection pipes connected to said nozzle means for injecting said fuel and oxidizer in a direction substantially transverse to said exhaust gases;

means for supplying said fuel and oxidizer to said injection means;

control means for providing jet reaction engine thrust control and selective introduction of said fuel and oxidizer through selected ones of said plurality of injection means for providing yaw, pitch and roll control; and sensing means for determining the difference in respective levels of fuel and oxidizer contained in said tank means and for selecting the introduction of fuel and oxidizer through said injection means in response to said difference in levels.

References Cited in the file of this patent
UNITED STATES PATENTS

| | | |
|---|---|---|
| 2,916,873 | Walker | Dec. 15, 1959 |
| 2,943,821 | Wetherbee | July 5, 1960 |
| 2,949,007 | Aldrich et al. | Aug. 16, 1960 |
| 2,952,123 | Rich | Sept. 13, 1960 |
| 3,010,280 | Hausmann | Nov. 28, 1961 |
| 3,015,210 | Williamson et al. | Jan. 2, 1962 |
| 3,058,303 | Mulready | Oct. 16, 1962 |

FOREIGN PATENTS

| | | |
|---|---|---|
| 748,983 | Great Britain | May 16, 1956 |